(12) United States Patent
Alfano et al.

(10) Patent No.: US 10,167,077 B2
(45) Date of Patent: Jan. 1, 2019

(54) ROTOR DOME, A ROTOR, AND A ROTORCRAFT

(71) Applicant: AIRBUS HELICOPTERS, Marignane (FR)

(72) Inventors: David Alfano, Aix en Provence (FR); Damien Desvigne, Aix en Provence (FR); Raphael Fukari, Le Rove (FR)

(73) Assignee: AIRBUS HELICOPTERS, Marignane (FR)

( * ) Notice: Subject to any disclaimer, the term of this patent is extended or adjusted under 35 U.S.C. 154(b) by 428 days.

(21) Appl. No.: 14/939,275

(22) Filed: Nov. 12, 2015

(65) Prior Publication Data

US 2016/0137296 A1  May 19, 2016

(30) Foreign Application Priority Data

Nov. 14, 2014 (FR) ...................................... 14 02562

(51) Int. Cl.

| | |
|---|---|
| B64C 7/00 | (2006.01) |
| B64C 11/14 | (2006.01) |
| B64C 27/00 | (2006.01) |
| B64C 27/04 | (2006.01) |
| B64C 27/32 | (2006.01) |

(52) U.S. Cl.
CPC .............. *B64C 27/001* (2013.01); *B64C 7/00* (2013.01); *B64C 11/14* (2013.01); *B64C 27/04* (2013.01); *B64C 27/32* (2013.01); *B64C 2027/003* (2013.01)

(58) Field of Classification Search
CPC ............ B64C 7/00; B64C 11/02; B64C 11/14; B64C 27/001; B64C 27/04; B64C 27/32; B64C 2027/003
See application file for complete search history.

(56) References Cited

U.S. PATENT DOCUMENTS 2,394,749 A * 2/1946 Chester .................. B64C 11/14
                                                              285/189
4,212,588 A   7/1980 Fradenburgh
4,281,967 A   8/1981 Mouille et al.
(Continued)

FOREIGN PATENT DOCUMENTS

EP     2727832    5/2014
FR     2863583    6/2005
(Continued)

OTHER PUBLICATIONS

French Search Report for French Application No. FR 1402562, Compelted by the French Patent Office Jul. 2, 2015, 6 Pages.
(Continued)

*Primary Examiner* — Logan Kraft
*Assistant Examiner* — Christopher R Legendre
(74) *Attorney, Agent, or Firm* — Brooks Kushman P.C.

(57) ABSTRACT

A dome for a rotor comprising a cap extending radially from an axis of rotation in elevation towards a periphery and in azimuth over 360 degrees, the cap extending in thickness from a bottom face towards a top face above the bottom face. The dome includes at least one slot extending between the periphery and the axis of rotation in elevation, each slot passing right through a thickness of the cap by extending in elevation from the bottom face to the top face.

20 Claims, 3 Drawing Sheets

(56) References Cited

U.S. PATENT DOCUMENTS

| | | | |
|---|---|---|---|
| 7,270,520 B2 | 9/2007 | Sudre et al. | |
| 9,702,340 B2* | 7/2017 | Martino | F03D 3/02 |
| 2009/0304511 A1* | 12/2009 | Brannon, III | B64C 7/00 |
| | | | 416/179 |
| 2012/0174699 A1* | 7/2012 | Hoffmann | B64C 11/008 |
| | | | 74/571.1 |
| 2013/0294886 A1* | 11/2013 | Martino | F03D 3/02 |
| | | | 415/4.4 |
| 2016/0137296 A1* | 5/2016 | Alfano | B64C 27/001 |
| | | | 416/223 R |
| 2016/0137297 A1* | 5/2016 | Alfano | B64C 27/001 |
| | | | 416/245 R |
| 2017/0088258 A1* | 3/2017 | Alfano | B64C 27/32 |

FOREIGN PATENT DOCUMENTS

| | | | |
|---|---|---|---|
| WO | 2007055813 A2 | 5/2007 | |
| WO | 2007055813 A3 | 5/2007 | |

OTHER PUBLICATIONS

Notice of Preliminary Rejection for Korean Application No. 2015-0159622, dated May 15, 2017, 5 Pages.

Korean Notice of Preliminary Rejection dated Nov. 29, 2017, Application No. 10-2015-0159622, Applicant Airbus Helicopters, 3 Pages.

\* cited by examiner

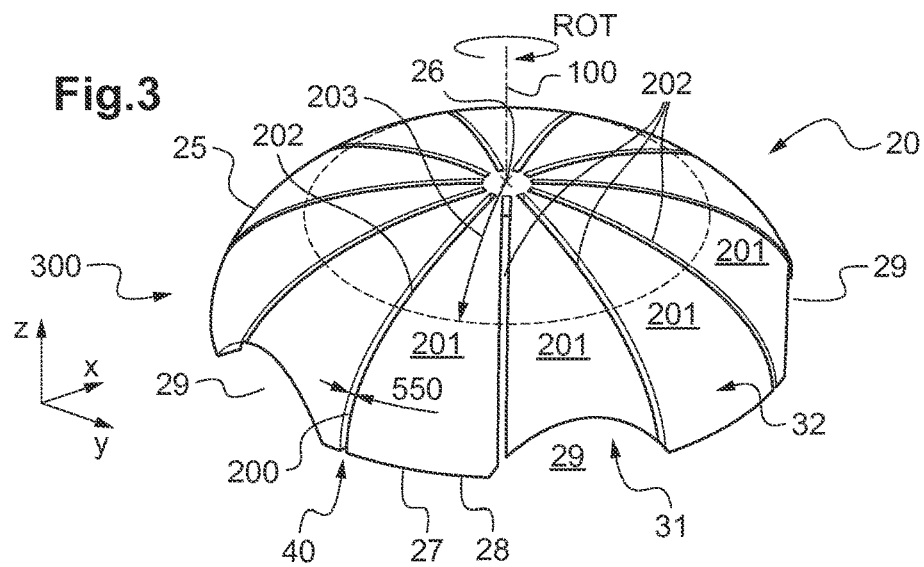
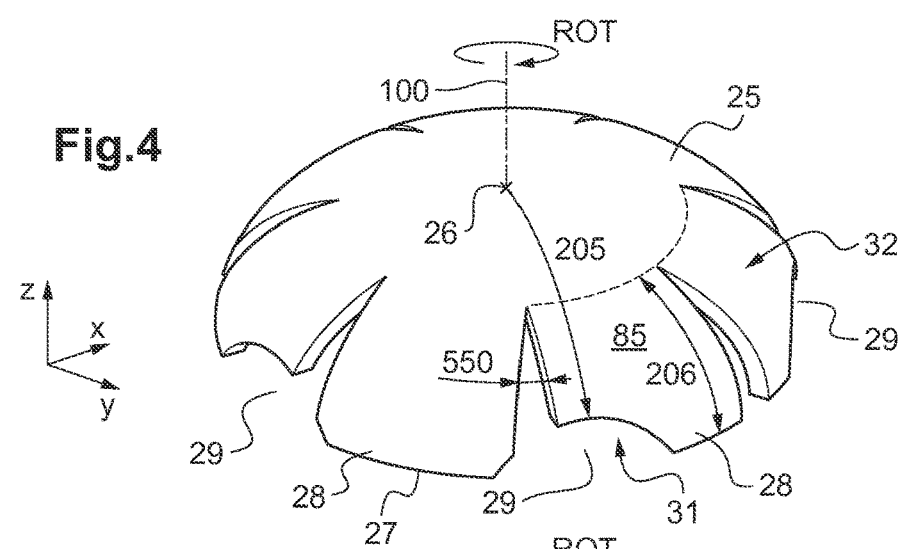
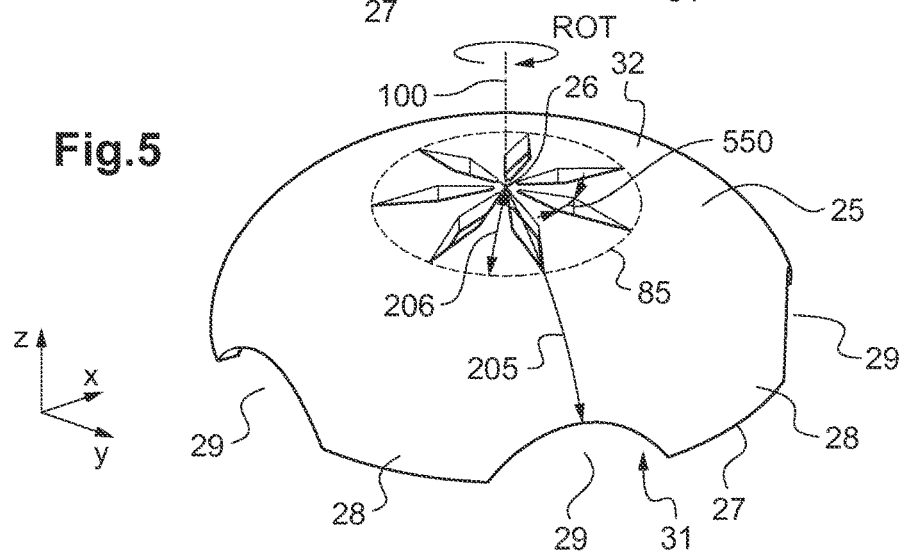

ROTOR DOME, A ROTOR, AND A ROTORCRAFT

CROSS REFERENCE TO RELATED APPLICATION

This application claims priority to French patent application No. FR 14 02562 filed on Nov. 14, 2014, the disclosure of which is incorporated in its entirety by reference herein.

BACKGROUND OF THE INVENTION (1) Field of the Invention

The present invention relates to a dome for a rotorcraft lift rotor, and also to a rotorcraft provided with such a dome.

(2) Description of Related Art

A rotorcraft conventionally includes an airframe extending from a nose to a tail. The tail may comprise a tail boom carrying a fin and stabilizers.

The airframe may carry at least one rotor providing the rotorcraft with at least some of its lift and possibly with propulsion. Such a rotor is referred to below as a "lift rotor", and sometimes as a "main rotor" by the person skilled in the art.

The tail also includes a tail fin, sometimes carrying a rotor for controlling yaw movement of the rotorcraft. As a result, this rotor is sometimes referred to as a "tail rotor", given its location within the rotorcraft.

The airframe also has covers arranged under the main rotor. These covers may be movable covers serving to give access to a power plant, for example. Such covers are conventionally referred to as "engine covers".

While the rotorcraft is flying in translation, air flows along the rotorcraft. The slipstream of air downstream from the lift rotor and the covers of the airframe is generally disturbed. Such disturbances can then impact against a fin and/or a stabilizer at the tail of the rotorcraft.

This disturbed slipstream is commonly referred to as the "wake". This term is used below for reasons of convenience, even though it is not entirely appropriate. Specifically, in theory, a wake corresponds to a region downstream from an obstacle in a flowing fluid, with the fluid being at rest in that region relative to the obstacle.

The impact of the disturbances generated by a lift rotor on the tail of a rotorcraft can lead to one or more modes of vibration of the tail being excited aerodynamically, where such excitation is commonly referred to in aviation as "tail-shake". Such excitation presents numerous drawbacks, and in particular:

in terms of comfort for the crew and for passengers;
in terms of fatigue for parts and equipment; and
in terms of operation of certain systems of the rotorcraft.

Furthermore, the air flow can become separated locally from the airframe downstream from a lift rotor, and in particular downstream from the engine covers. Such separation tends to amplify the magnitude of the excitation on the tail of the aircraft by increasing the amplitude and by enriching the frequency signature of such aerodynamic fluctuations.

In order to reduce such excitation, a dome may be arranged on the head of the lift rotor.

A dome is generally in the form substantially of a cap of an ellipsoid of revolution.

Furthermore, notches are arranged in a peripheral ring of the dome, in particular to avoid impeding the flapping and lead/lag movements of the blades.

Under such circumstances, a dome may comprise an ellipsoidal cap provided with one notch per blade of the rotor.

While flying in translation, this dome deflects the flow of air downstream from the lift rotor in a downward direction. The flow of air is then deflected mainly towards the covers and the tail boom, and no longer towards the stabilizer and the fin of the rotorcraft. The tail shake effect is thus decreased.

Furthermore, a dome tends to deflect the slipstream downwards downstream from a lift rotor.

In addition, the dome tends to limit the extent to which a downstream slipstream becomes separated from engine covers.

Nevertheless, such domes do not always perform well.

A dome is generally dimensioned so as to deflect a slipstream downwards, and to minimize said separation of the slipstream downstream from the lift rotor carrying the dome. This dimensioning tends to determine the diameter of the dome.

Under such circumstances, the dome does not provide any means for acting on the frequency signature of the slipstream that is generated, nor does it provide means for acting on the forces to which the dome is subjected. A manufacturer therefore cannot act on a dome of given shape in order to solve problems of interactions between the slipstream and the dome.

Documents U.S. Pat. Nos. 4,212,588, 4,281,967, EP 2 727 832, FR 2 863 583, and WO 2007 055813 are also known.

BRIEF SUMMARY OF THE INVENTION

An object of the present invention is thus to propose an alternative dome.

According to the invention, a dome is for a rotor of a rotorcraft, the dome comprising a cap extending radially from an axis of rotation in elevation towards a periphery and in azimuth over 360 degrees, the cap extending in thickness from a bottom face for facing a hub of the rotor towards a top face above the bottom face, said dome including notches enabling a blade to pass therethrough in order to allow the blade to flap. By way of example, the periphery may be crenellated in order to define a succession of crenellations and of notches.

This dome includes at least one slot extending between the periphery and the axis of rotation in elevation of the dome, each slot being distinct from a notch, each slot passing right through a thickness of the cap by extending in elevation from the bottom face to the top face, the dome including in azimuth along at least one internal circle a succession of solid surfaces represented by the top face and of openings represented by each slot facing an incident air stream so that said incident air stream impacts in succession against a solid surface and then against an opening during rotation of said dome about the axis of rotation in elevation.

The periphery of the dome may define notches that are dimensioned in particular to enable a blade to flap without interfering with the dome.

Each slot of the dome is therefore not a notch and does not enable a blade to flap. Each slot is thus provided within a dome between its periphery and the axis of rotation in elevation of the dome. By way of example, the invention can be applied to an existing dome. An operator can thus pierce the dome in order to provide the required slots.

The slots of a dome of the invention are thus to be distinguished from notches, if any.

The dome serves to modify the flow of air by generating geometrical variations in the cap. Each slot imparts geometrical variations to the dome that are discontinuous, both radially and in azimuth in decoupled manner.

The presence of slots serves to generate a pulsed flow. This flow impacts in succession on the top face and in an opening provided by a slot because of the rotation of the dome. Thus, the incident air flow impacting the cap successively enters or leaves a slot.

The irregular shape of the dome in azimuth along at least one radius has the consequence of disturbing the incident air flow at the frequency at which it passes in succession over the irregularity introduced by the slot.

For convenience, the top face and the bottom face are referred to as "irregular" because of the presence of slots. In contrast, the top face and the bottom face of a conventional dome in the shape of a spherical cap are referred to as "regular".

The dome of the invention thus generates turbulent flow structures that are generally of smaller size than the structures that naturally stem from a dome having faces that are regular. This wake interacts with the "natural" wake of the dome, and can potentially modify its frequency content because of the highly non-linear nature of interactions of this type. Consequently, the wake generated by the dome of the invention is pulsed.

This spectral redistribution of the overall wake from the dome can potentially lead to a reduction in the magnitude of the dynamic behavior of the wake. Specifically, a large fraction of the resulting turbulence is smaller than with a standard dome having regular faces. Such turbulence therefore naturally dissipates more quickly. The pulsed wake from the dome of the invention also makes it possible to act on potential separations of the air flow over the engine covers at frequencies higher than the frequency at which the blades go past, and that can reduce the magnitude of the wake that is generated.

In addition, the amplitudes of the forces and moments that are exerted on the means fastening the dome to the rotor tend to be reduced.

These frequencies can be adjusted by adapting the number and the shape of the slots, and thus without modifying the overall size of the dome.

Consequently, the invention can be used as a replacement for an existing dome.

In addition, each slot is also likely to expel stagnant flows from under the dome, thus avoiding the presence of dead flow zones. The direct consequence is a overall decrease in drag of the dome.

The dome of the invention may also include one or more of the following characteristics.

Thus, the periphery need not be circular, but may be crenellated so as to define a succession of crenellations and of notches, each notch serving to allow a blade to flap, and the number of notches is different from the number of slots.

The number of slots may be equal to the number of notches. In this event, each slot may then be arranged in register with or halfway between said notches.

Nevertheless, the number of slots may be different from the number of notches. This characteristic makes it possible to act on the wake that is generated by introducing disturbances appearing at a specific frequency that is different from the frequency at which the openings and the blades pass.

Consequently, the number of notches and the number of slots are advantageously mutually prime.

In addition, at least one slot extends along a radius of said dome.

In a first embodiment, all of the slots extend in the dome along respective radii of said dome. Such domes are thus obtained by making holes in the cap along respective radii.

The slots may be distributed on the surface of the dome in a regular arrangement that is angularly uniform, or in an irregular arrangement.

However, the slots need not all extend radially.

In a variant, at least one slot therefore does not extend entirely along a radius of the dome and therefore does not extend in a single plane containing said axis of rotation. Such a slot is thus not a radial slot, contrary to a slot extending along a radius.

In a second embodiment, no slot extends in the dome along a radius of said dome. Such domes are obtained by making holes in the cap that do not extend along the radii, but that extend along bent lines or curves passing through the axis of rotation in elevation of the dome or along lines not passing through the axis of rotation in elevation of the dome.

The slots may be distributed on the surface of the dome in a regular arrangement that is angularly uniform, or in an irregular arrangement.

A third embodiment provides for arranging at least one slot that extends along a radius and at least one slot that does not extend along a radius.

Since the dome is for rotation in a particular direction of rotation, at least one slot may have a convex shape that is convex in the direction of rotation of the dome.

In addition, at least one slot may present a width in azimuth that varies radially.

Furthermore, at least one slot may possibly extend in an annulus of the dome lying between said periphery and said axis of rotation in elevation.

Such an annulus does not reach the periphery and/or the axis of rotation. The slots may thus be "partial" slots, being confined within an annulus of the dome.

In alternative manner, at least one slot is on the contrary said to be "total", extending from the vicinity of the axis of rotation in elevation to the periphery.

At least one slot may open out to the periphery. Such a slot may be a partial or total slot.

In addition, in a variant, the cap of the dome comprises a plurality of arms extending spanwise from the axis of rotation in elevation towards said periphery, each arm extending in azimuth between two slots opening out to the periphery, each arm presenting an airfoil profile that extends in azimuth between a leading edge in the vicinity of one slot and a trailing edge in the vicinity of another slot.

At least one arm presents a twist relationship determining a twist angle for each section of the arm as a function of a reference section.

Under such circumstances, each arm represents a twisted lift-providing airfoil surface.

In addition, at least one arm may present a width in azimuth that increases on going away from the axis of rotation in elevation.

In addition to a dome, the invention provides a rotorcraft rotor provided with a hub carrying a plurality of blades. The rotor thus includes a dome of the above-described type. The blades thus cannot penetrate into the slots since said slots do not constitute notches suitable in particular for enabling the blades to flap.

Furthermore, the invention provides a rotorcraft having at least one rotor of this type.

BRIEF DESCRIPTION OF THE SEVERAL VIEWS OF THE DRAWINGS

The invention and its advantages appear in greater detail in the context of the following description of embodiments given by way of illustration and with reference to the accompanying figures, in which:

FIG. 3 is a view of a dome provided with total slots extending fully along radii of the dome, the slots having width that is constant in azimuth;

FIG. 4 is a view of a dome provided with partial slots extending along radii of the dome and reaching the periphery of the dome, each of the slots having width that varies in azimuth;

FIG. 5 is a view of a dome provided with partial slots extending along radii of the dome in the vicinity of the axis of rotation in elevation of the dome, each of the slots having width that varies in azimuth;

Elements that are present in more than one of the figures are given the same references in each of them.

DETAILED DESCRIPTION OF THE INVENTION

It should be observed that three mutually orthogonal axes X, Y, and Z are shown in the figures.

The X axis is said to be longitudinal. Another axis Y is said to be the "transverse" axis. Finally, a third axis Z is said to be the "elevation" axis.

Figure 1:
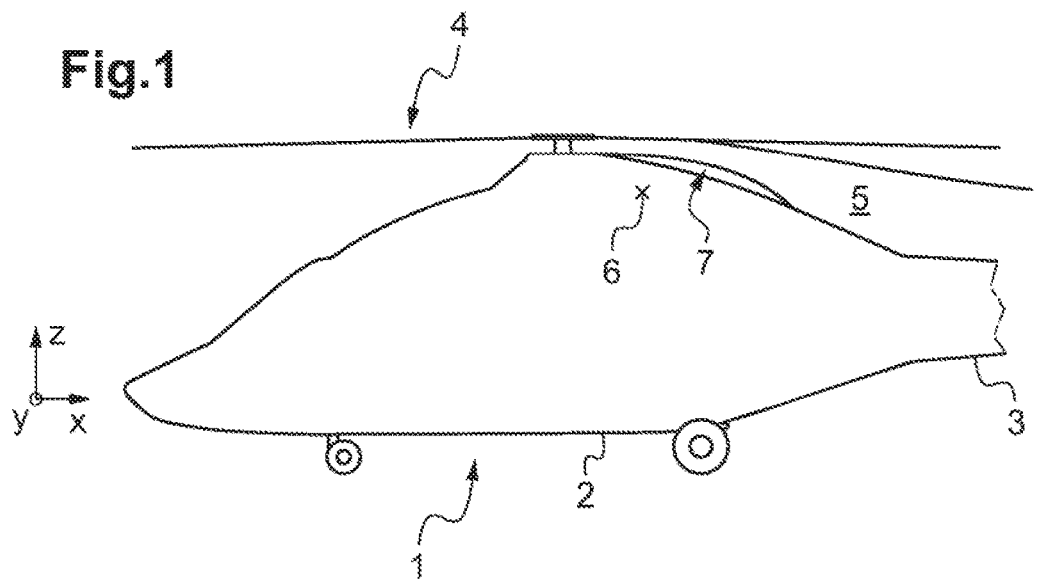
FIG. 1 is a view of a prior art rotorcraft without a dome.

FIG. 1 shows a prior art rotorcraft illustrating the problem of the invention.

The rotorcraft 1 is conventionally provided with an airframe 2 extending from a nose to a tail and including a tail boom 3. The tail boom 3 may carry a tail fin, stabilizers, and possibly a rotor.

The airframe 2 carries at least one main rotor 4 providing the rotorcraft with at least part of its lift and possibly also propulsion.

The wake 5 generated by the high portions of the rotorcraft and in particular its rotor 4 impacts against the tail of the aircraft, and in particular the tail fin and the stabilizers.

In addition, the wake 5 tends to separate from the airframe 2 in a separation zone 7 that is situated in the proximity of engine covers 6.

Figure 2:
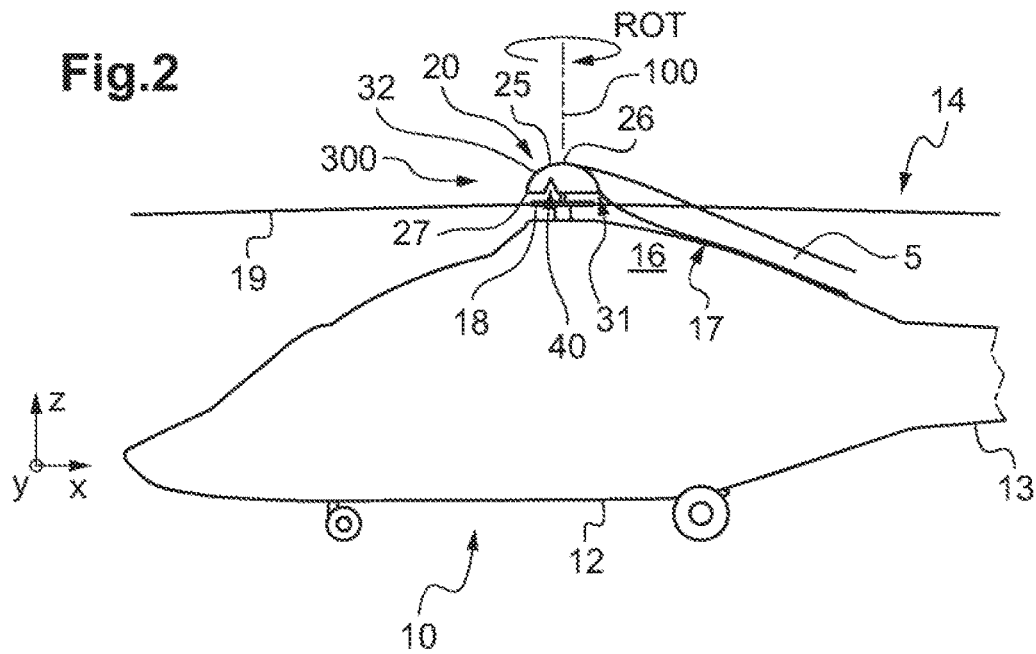
FIG. 2 is a view of a rotorcraft of the invention.

FIG. 2 shows a rotorcraft 10 of the present invention.

The rotorcraft 10 has an airframe 12 extending from a nose to a tail and including a tail boom 13. The airframe 12 carries at least one main rotor 14 providing the rotorcraft with at least part of its lift and possibly also propulsion. The rotor 14 has a hub 18 carrying a plurality of blades 19.

Furthermore, the rotor 4 has a dome 20 of the invention.

The dome is provided with a cap 25, e.g. a spherical cap. By way of example, the cap 25 may be fastened to the hub 18 so as to be constrained to rotate with the main rotor 14.

The cap 25 extends radially from an axis of rotation 100 in elevation towards a periphery 27.

The cap 25 also extends in azimuth over 360 degrees. Furthermore, the cap 25 extends in elevation in its thickness direction from a bottom face facing the hub 18 towards a top face. The centers 26 of each of the faces are then arranged on the axis of rotation 100 in elevation.

In addition, the dome includes at least one slot 40 provided in the cap between the axis of rotation 100 in elevation all the way to the periphery 27.

Each slot then passes right through the thickness of the cap. Each slot 40 extends in elevation from the bottom face to the top face. Each slot thus defines an opening. Air may thus pass through the cap from its top face to its bottom face and vice versa through the opening provided by each slot.

The wake 5 generated by the top portions of the rotorcraft is then deflected downwards by the dome 20.

During rotation of the dome, an incident air stream 300 impacts in succession against a solid surface of a face 31, 32 of the dome and an opening of a slot 40. The incident air stream 300 may impact a bottom face 31 and a top face 32 of the dome. The expression "air stream impacting a slot" or the equivalent should be understood to mean that the stream of air is directed against a slot, and penetrates into the opening provided by the slot. Conversely, away from the slots, the stream of air impacts the solid surface of the bottom face and/or of the top face.

The slots 40 thus make it possible to generate a pulsed wake that interacts with the wake generated by the cap. The overall pulsed wake generated by the dome 20 potentially leads to a reduction in the overall magnitude of the dynamic behavior of the wake 5 and tends at least to limit separation of the wake 5 in the separation zone 17 situated in the proximity of the engine covers 16.

FIGS. 3 to 7 show variants of the dome 20.

With reference to FIG. 3, the dome 20 is provided with a cap 25. The cap 25 thus extends radially from an axis of rotation 100 in elevation to a periphery 27.

The periphery 27 may be crenellated in order to define a succession of crenellations 28 and of notches 29.

Each notch 29 is then arranged facing a blade so as to avoid interference between the blade and the cap as a result of flapping movements of the blade. By construction, each notch 29 is arranged between the periphery 27 and the axis of rotation 100 in elevation of the cap 25.

Conversely, the cap is pierced between the periphery 27 and the axis of rotation 100 in elevation in order to present at least one slot 40.

Each slot then passes through the thickness of the cap.

Relative to an incident air stream 300, the cap 25 presents a succession of openings 202 and of solid surfaces 201 at least on an internal circle that is geometrically situated at a radius 203 and centered on the axis of rotation 100 in elevation. Each opening is constituted by a slot 40, and each solid surface is constituted by a face of the cap. Because of the rotation ROT of the dome about the axis of rotation 100 in elevation, the incident air stream thus impacts in succession against an opening and a solid surface.

The cap may include a plurality of slots 40.

In particular, the number of notches 29 may be different from the number of slots 40. By way of example, the number of notches 29 and the number of slots 40 may be mutually prime.

In a first embodiment, shown in FIGS. 3 to 5, at least one slot extends radially, and therefore along a radius 200 of the cap.

By way of example, all the slots extend radially.

Regardless of the embodiment, at least one slot may open out to the periphery 27.

Thus, the variants shown in FIGS. 3 and 4 have slots that open out to the periphery 27, either through a crenellation 28 or through a notch 29.

In addition, and regardless of the embodiment, at least one slot may extend spanwise all or part of the way along the cap.

Consequently, the variant shown in FIG. 3 has slots extending all the way along a radius. These slots, referred to as "total" slots, extend from the immediate proximity of the axis of rotation 100 in elevation to the periphery 27.

However, the variants shown in FIGS. 4 and 5 have slots extending part of the way along a radius. These slots, referred to as "partial" slots, extend in a restricted annulus 85 of the dome 20 arranged between the periphery 27 and the axis of rotation 100 in elevation. Each annulus has a radius referred to as a "small" radius 206 that is shorter than the smallest radius of the cap referred to as the "minimum radius 205". By way of example, the small radius 206 is less than 95% of the minimum radius, and in particular less than two thirds of the minimum radius 205.

Moreover and regardless of the embodiment, a slot may present a width 550 that is constant or that varies in an azimuth direction.

The width 550 of the slots 40 of the variant shown in FIG. 3 is thus constant in azimuth.

Conversely, FIG. 4 shows slots presenting a width in azimuth that increases on going away from said axis of rotation 100 in elevation.

FIG. 5 shows slots presenting a width in azimuth that increases on going away from the axis of rotation 100 in elevation until it reaches a maximum width. Then, the width decreases on going away from the axis of rotation 100 in elevation.

The width in elevation of the slot going from the bottom face to the top face of the cap may also vary.

Figure 6:
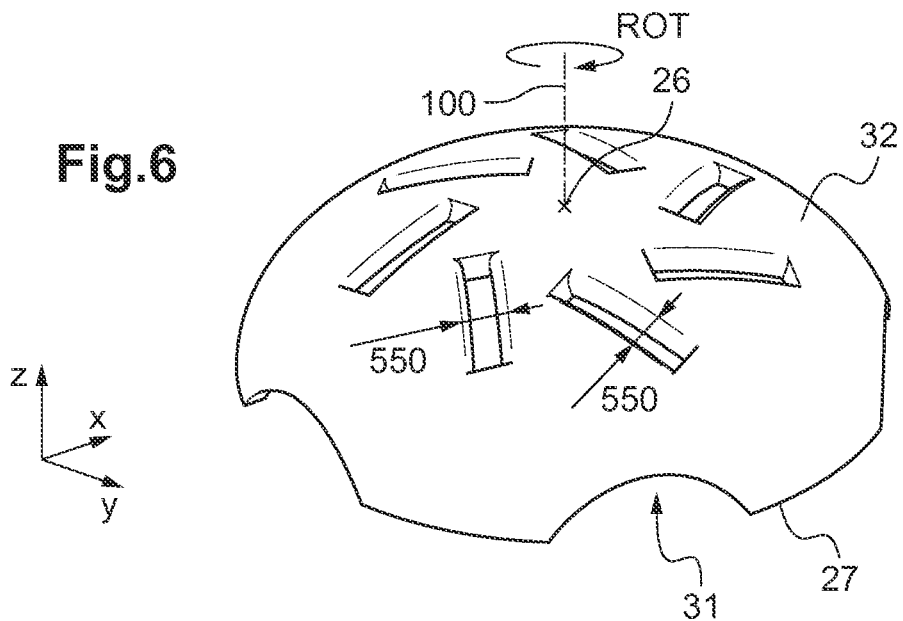
FIG. 6 is a view of a dome provided with partial slots arranged along lines that do not intersect the axis of rotation in elevation.
Figure 7:
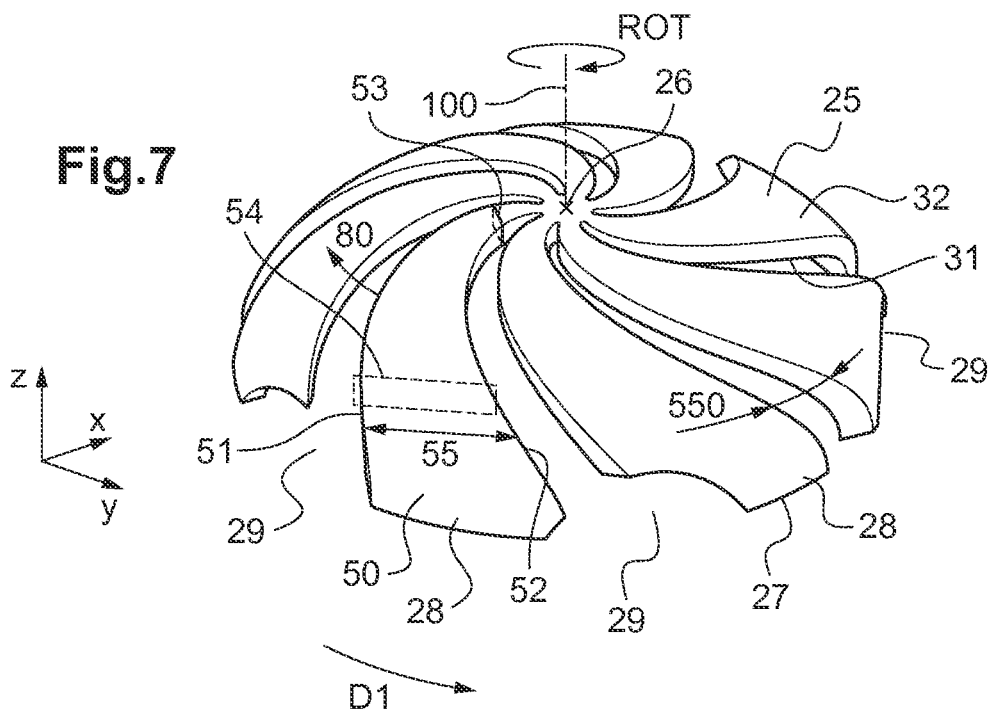
FIG. 7 is a view of a dome provided with convex total slots defining arms, each of the arms having width that varies in azimuth.

In the second embodiment shown in FIGS. 6 and 7, at least one slot does not extend radially. More precisely, FIG. 6 shows partial slots, while FIG. 7 shows total slots.

In the variant shown in FIG. 6, such a slot may extend along a straight line that does not intersect the center 26 of each face and the axis of rotation 100 in elevation.

In addition, the example shown in FIG. 6 shows partial slots that present a width that is constant in azimuth and varies in elevation.

In variants, a slot may extend along a bent line or else along a convex line.

By way of example, the example shown in FIG. 7 shows total slots that present width that varies in azimuth.

In addition, these slots present a convex shape that is convex pointing 80 in the direction of rotation ROT of the dome 20.

In addition, the cap 25 shown in FIG. 7 includes a plurality of airfoil arms 50.

Each arm extends spanwise from the axis of rotation 100 in elevation towards the periphery 27, and in azimuth in a direction Dl between two slots 40 opening out onto the periphery 27.

Each arm 50 then presents an airfoil profile that extends in azimuth between a leading edge 51 in the vicinity of a slot 40 and a trailing edge 52 in the vicinity of another slot 40.

FIG. 7 shows arms formed by non-radial slots.

However, the caps shown in FIGS. 3 and 4 may also include arms of airfoil profile.

Regardless of the type of slot, at least one arm 50 may present a twist relationship. Such a twist relationship usually determines a twist angle for each section 54 of the arm as a function of a reference section 53. The term "section" refers to a cross-section of the arm in a plane extending in elevation from the trailing edge to the leading edge of the arm and perpendicular to a geometrical stacking line of the arm.

Furthermore, at least one arm 50 may present a width 55 in azimuth that increases on going away from the axis of rotation 100 in elevation.

Naturally, the present invention may be subjected to numerous variations as to its implementation. Although several embodiments are described above, it should readily be understood that it is not conceivable to identify exhaustively all possible embodiments. It is naturally possible to envisage replacing any of the means described by equivalent means without going beyond the ambit of the present invention.

What is claimed is:

1. A dome for a rotor of a rotorcraft, the dome comprising a cap extending radially and in elevation from a center of the cap on an axis of rotation towards a periphery of the cap and in azimuth over 360 degrees, the cap extending in thickness from a bottom face for facing a hub of the rotor towards a top face above the bottom face, the dome including notches enabling blades to pass therethrough in order to allow the blades to flap;

wherein the dome includes a plurality of slots between the periphery and the axis of rotation in elevation, each slot being distinct from the notches, each slot passing through a thickness of the cap by extending in elevation from the bottom face to the top face, the dome including in azimuth along at least one circular path about the axis of rotation a succession of solid surfaces defined by parts of the top face and two adjacent slots, respectively, of the plurality of slots, the solid surfaces facing an incident air stream so that the incident air stream impacts in succession against a solid surface of the solid surfaces and a slot of the plurality of slots during rotation of the dome about the axis of rotation in elevation, wherein the solid surfaces comprise a plurality of arms extending spanwise from the axis of rotation in elevation towards the periphery, each arm extending in azimuth between two adjacent slots, respectively, of the plurality of slots, each arm presenting an airfoil profile extending in azimuth between a leading edge in the vicinity of one slot of the two adjacent slots, respectively, and a trailing edge in the vicinity of the other slot of the two adjacent slots, respectively.

2. The dome according to claim 1, wherein the number of the notches is different from the number of the plurality of slots.

3. The dome according to claim 2, wherein the number of the notches and the number of the plurality of slots are mutually prime.

4. The dome according to claim 1, wherein at least one arm of the plurality of arms presents a plurality of sections and a twist relationship determining a twist angle for each section of the plurality of sections of the at least one arm each section of the plurality of sections representing a cross-section of the at least one arm in a plane extending in elevation from a trailing edge to a leading edge of the at least one arm and perpendicular to a geometrical stacking line of the arm.

5. The dome according to claim 1, wherein at least one arm of the plurality of arms presents a width in azimuth that increases from the center of the cap to the periphery of the cap.

6. The dome according to claim 1, wherein each slot of the plurality of slots extends in a plane including the axis of rotation.

7. The dome according to claim 1, wherein each slot of the plurality of slots has portions extending in a plane not containing the axis of rotation.

8. The dome according to claim 1, wherein the dome is for rotation in a particular direction of rotation, each slot of the plurality of slots presenting a convex shape that is convex pointing in the particular direction of rotation of the dome.

9. The dome according to claim 1, wherein each slot of the plurality of slots presents a width that varies in azimuth.

10. The dome according to claim 1, wherein each slot of the plurality of slots extends in an annulus of the dome lying between the periphery and the axis of rotation in elevation, the annulus not reaching the periphery and/or the axis of rotation.

11. The dome according to claim 1, wherein each slot of the plurality of slots opens to the periphery.

12. A rotorcraft rotor having a hub carrying a plurality of blades, wherein the rotor includes a dome according to claim 1, the blades being unable to penetrate into the plurality of slots.

13. A rotorcraft, wherein the rotorcraft includes at least one rotor according to claim 12.

14. The dome according to claim 1, wherein the number of the notches is different from the number of the plurality of slots.

15. A dome for a rotor of a rotorcraft, the dome comprising a cap extending radially and in elevation from a center of the cap on an axis of rotation towards a periphery of the cap and in azimuth over 360 degrees, the cap extending in thickness from a bottom face for facing a hub of the rotor towards a top face above the bottom face, the dome including notches enabling blades to pass therethrough in order to allow the blades to flap;
  wherein the dome includes a plurality of slots between the periphery and the axis of rotation in elevation, each slot being distinct from the notches, each slot passing through a thickness of the cap by extending in elevation from the bottom face to the top face, the dome including in azimuth along at least one circular path about the axis of rotation a succession of solid surfaces defined by parts of the top face and two adjacent slots, respectively, of the plurality of slots, the solid surfaces facing an incident air stream so that the incident air stream impacts in succession against a solid surface of the solid surfaces and a slot of the plurality of slots during rotation of the dome about the axis of rotation in elevation, wherein the dome is for rotation in a particular direction of rotation, and each slot of the plurality of slots presents a convex shape that is convex pointing in the particular direction of rotation of the dome.

16. The dome according to claim 15, wherein the number of the notches is different from the number of the plurality of slots.

17. The dome according to claim 16, wherein the number of the notches and the number of the plurality of slots are mutually prime.

18. A dome for a rotor of a rotorcraft, the dome comprising a cap extending radially and in elevation from a center of the cap on an axis of rotation towards a periphery of the cap and in azimuth over 360 degrees, the cap extending in thickness from a bottom face for facing a hub of the rotor towards a top face above the bottom face, the dome including notches enabling blades to pass therethrough in order to allow the blades to flap;
  wherein the dome includes a plurality of slots between the periphery and the axis of rotation in elevation, each slot being distinct from the notches, each slot passing through a thickness of the cap by extending in elevation from the bottom face to the top face, the dome including in azimuth along at least one circular path about the axis of rotation a succession of solid surfaces defined by parts of the top face and two adjacent slots, respectively, of the plurality of slots, the solid surfaces facing an incident air stream so that the incident air stream impacts in succession against a solid surface of the solid surfaces and a slot of the plurality of slots during rotation of the dome about the axis of rotation in elevation, wherein each slot of the plurality of slots presents a width that varies in azimuth.

19. The dome according to claim 18, wherein the number of notches is different from the number of the plurality of slots.

20. A dome for a rotor of a rotorcraft, the dome comprising a cap extending radially and in elevation from a center of the cap on an axis of rotation towards a periphery of the cap and in azimuth over 360 degrees, the cap extending in thickness from a bottom face for facing a hub of the rotor towards a top face above the bottom face, the dome including notches enabling blades to pass therethrough in order to allow the blades to flap;
  wherein the dome includes a plurality of slots between the periphery and the axis of rotation in elevation, each slot being distinct from the notches, each slot passing through a thickness of the cap by extending in elevation from the bottom face to the top face, the dome including in azimuth along at least one circular path about the axis of rotation a succession of solid surfaces defined by parts of the top face and two adjacent slots, respectively, of the plurality of slots, the solid surfaces facing an incident air stream so that the incident air stream impacts in succession against a solid surface of the solid surfaces and a slot of the plurality of slots during rotation of the dome about the axis of rotation in elevation, wherein the plurality of slots open to the periphery.

\* \* \* \* \*